No. 718,216. PATENTED JAN. 13, 1903.
C. S. PURDY.
HOOK.
APPLICATION FILED APR. 5, 1902.
NO MODEL.
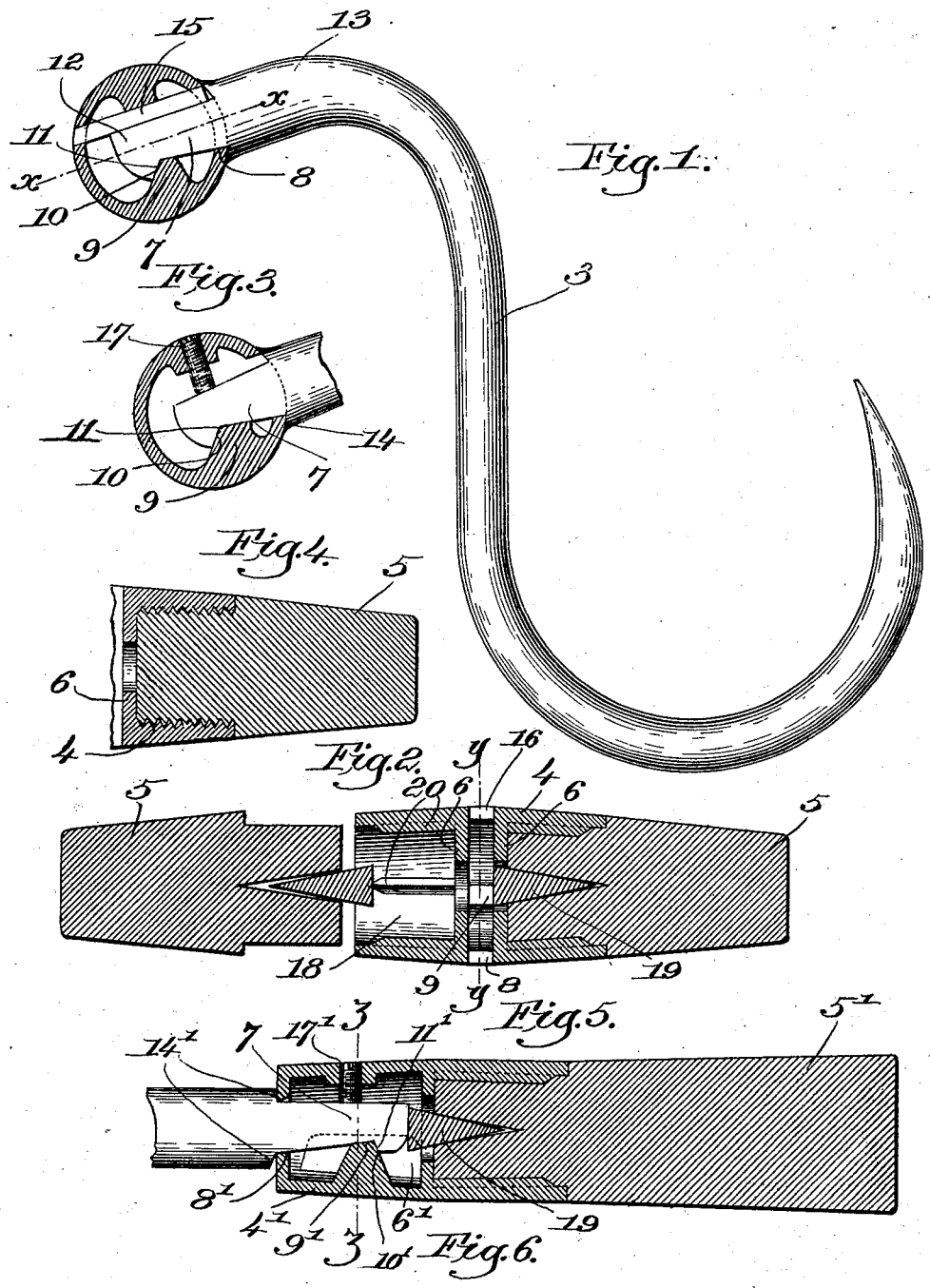

UNITED STATES PATENT OFFICE.

CHARLES S. PURDY, OF SOMERVILLE, MASSACHUSETTS, ASSIGNOR OF ONE-HALF TO GEORGE E. DUTTON AND JOHN W. McLEAN, OF BOSTON, MASSACHUSETTS, COPARTNERS DOING BUSINESS AS DUTTON & McLEAN.

HOOK.

SPECIFICATION forming part of Letters Patent No. 718,216, dated January 13, 1903.

Application filed April 5, 1902. Serial No. 101,461. (No model.)

*To all whom it may concern:*

Be it known that I, CHARLES S. PURDY, a citizen of the United States, residing at Somerville, county of Middlesex, and State of Massachusetts, have invented an Improvement in Hooks, of which the following description, in connection with the accompanying drawings, is a specification, like figures on the drawings representing like parts.

This invention relates to hooks—such as box-hooks, freight-handlers' hooks, meat-hooks, &c.—and has for its object to provide a novel way of detachably securing the handle to the shank of the hook.

In accordance with my invention the handle is provided with a suitable socket having a locking-shoulder, and the hook member has a stem adapted to enter said socket and provided with a coacting locking-shoulder, and means are provided to maintain said shoulders in engagement.

In the best form of my invention now known to me I prefer to make the handle member of the device with a central hollow body portion having on the interior thereof parallel flanges forming between them a groove to receive the stem on the end of the hook and between said flanges having a projection provided with a locking-shoulder. The stem of the hook member is adapted to be inserted through an opening in the shell of the hollow body portion of the handle and has on one side a projection to interlock with the projection in the handle, and means are carried by the handle to engage the opposite side of said stem to hold said shoulders or projections in locking engagement.

In the drawings, Figure 1 is a side elevation of my improved hook, the handle being shown in transverse section, substantially on the line *y y*, Fig. 2. Fig. 2 is a section of the handle, the shank of the hook being omitted, substantially on the line *x x*, Fig. 1, one of the handle-sections being shown as removed. Figs. 3, 4, 5, and 6 are modifications to be hereinafter referred to, Fig. 6 being a section on the line *z z*, Fig. 5.

While my invention is applicable to a variety of styles of hooks, I have, for convenience, in Fig. 1 illustrated it as applied to the common freight-handlers' hook, having a substantially S shape, and in said figure the substantially S-shaped member is designated by 3.

The handle portion of the hook comprises the central barrel or body portion 4 and the two handle-sections 5.

The central body portion 4 is hollow and will preferably be made of metal, and where the handle is to extend transversely to the shank of the hook member, as in Fig. 1, the said body portion 4 will be provided on its interior with the transverse ribs or flanges 6, which form between them a groove or socket to receive the stem 7 on the end of the handle, the said body portion being provided in its side with an opening 8, through which the stem may be inserted. Between the flanges is a projection 9, forming an inclined shoulder 10, which is adapted to interlock with a coacting shoulder 11 on the projection 12 at the end of the stem of the hook. The stem is smaller than the shank portion 13 of the hook, whereby shoulders 14 are formed which are shaped to fit the exterior of the handle. As seen in Fig. 1, the stem of the handle is inserted through the aperture 8 and the shoulder 11 brought into engagement with the shoulder 10 in the handle. Suitable means are then caused to engage the back of the stem to hold the locking-shoulders 10 and 11 in engagement, and because of the inclined position of said shoulders the handle is wedged between the shoulders 14 and 11 on the stem to thus firmly secure the handle in position.

In Fig. 1 I have shown a wedge or key-piece 15, which is driven through a suitable aperture 16 in the body portion 4 of the handle and which holds the interlocking shoulders in engagement, and in Fig. 3 I have illustrated a set-screw 17 for this purpose. In both instances, however, the important thing is to hold the inclined shoulders 10 and 11 firmly in engagement, to thereby draw the shoulder 14 hard against the exterior of the side of the handle.

The handle-sections 5 may be secured in suitable sockets 18 in any suitable way. In Fig. 2 I have illustrated said sockets as having a larger diameter adjacent the flanges 6 than at the end of the body portion 4, and the handle-sections are held in place by suitable wedges 19. I will preferably partially insert the wedge in the handle-section, as shown at the left in Fig. 2, and then will drive the handle-section into the socket, the wedge upon striking either the flange 6 of the handle or the stem 7 of the shank, according to its size, being driven home and spreading the end of the handle-section to key it in place. I have herein shown the barrel 4 as provided with one or more longitudinally-extending ribs 20, which when the handle 5 is driven home in the socket become embedded in the end of the handle, as shown in Figs. 2 and 5, and thus serve to lock the handle-section firmly in place. I have found from experience that the ribs 20 are sufficient of themselves to securely lock the handle-sections in place, and hence I may omit the wedge 19 entirely without departing from the spirit of my invention.

In Fig. 4 I have illustrated the handle-section 5 as having a screw-threaded engagement with the socket.

In some classes of hooks it is desirable to have the handle secured to the shank of the hook to extend in the direction of the length of the shank instead of transverse thereto, as in Figs. 1 to 4, and in Figs. 5 and 6 I have illustrated my invention as applied to this type of hook. In this embodiment of my invention the barrel portion 4' of the handle is hollow and has an aperture 8' in its end, through which the stem 7 is inserted. On the interior of the barrel or body portion 4' are parallel flanges 6', between which is the projection 9', having the inclined locking-shoulder 10', with which the coacting inclined shoulder 11 on the stem 7 interlocks. The stem 7, as will be seen from Fig. 6, is received between the flanges 6' and may be held in locking position by any suitable means, either by a key-piece or by a set-screw 17'. In this embodiment of my invention the set-screw by its engagement with the back side of the stem maintains the inclined shoulders 10 and 11 in engagement, and because of their inclination the shoulders 14' upon the shank of the hook are held hard against the end of the body portion 4'. The handle-section 5' is shown as secured in the socket in the end of the body portion 4' by means of a wedge 19.

While I have illustrated two ways in which my invention may be embodied, it will be evident that it is not limited to the form shown, for as the important feature of my invention resides in the inclined interlocking shoulders 10 and 11 and the means for holding them in engagement, whereby the shoulder 14 on the shank of the hook is held hard against the handle, it will be obvious that various changes in the details of the structure may be made without changing the essential features thereof.

Having described my invention, what I claim, and desire to secure by Letters Patent, is—

1. In a hook, a handle having a socket provided with an inclined locking-shoulder, a hook member having a stem provided with a coacting inclined locking-shoulder and a shoulder to engage the exterior of the handle, and means to hold said inclined shoulders in engagement, the inclination of the shoulders causing the shoulder on the stem to be held hard against the outside of the handle.

2. In a hook, a handle having a socket provided with an inclined locking-shoulder, a hook member having a stem provided on one side with a coacting locking-shoulder, and means carried by the handle and engaging the opposite side of the stem to hold the shoulders in engagement.

3. A hook comprising a handle member having a socket provided with a locking-shoulder, and a hook member the shank of which terminates in a stem having a coacting locking-shoulder, said shank having a second shoulder to engage the exterior of the handle, and means carried by the handle to hold said locking-shoulders in engagement.

4. In a hook, a handle portion having on its interior parallel flanges forming between them a groove, and a locking-shoulder in the groove, a hook portion having a stem adapted to be received in said groove, and a shoulder to engage the shoulder in the handle, and means to hold said shoulders in engagement.

5. In a hook, a handle portion having on its interior parallel flanges forming a groove, and a projection having an inclined shoulder in said groove, a hook portion having a stem to be received between said flanges and provided with a projection having an inclined shoulder to engage the shoulder in the handle, said hook portion having a second shoulder to engage the exterior of the handle, and means to hold said inclined shoulders in engagement, the inclination of the shoulders serving to wedge the stem tightly in place.

6. In a hook, a handle comprising in its construction a hollow body portion provided with a socket, a handle-section inserted in said socket, said body portion having ribs extending longitudinally of the socket and interlocking with the handle-section, combined with a hook member secured to said body portion.

7. In a hook, a handle comprising in its construction a hollow metallic body portion provided with a socket, a wooden handle-section secured in said socket, said body portion having ribs extending longitudinally thereof and embedded in the handle-section, combined with a hook member secured to the body portion.

In testimony whereof I have signed my name to this specification in the presence of two subscribing witnesses.

CHARLES S. PURDY.

Witnesses:
LOUIS C. SMITH,
JOHN C. EDWARDS.